US00RE39489E

(19) United States
(12) Reissued Patent
Fonfeder

(10) Patent Number: US RE39,489 E
(45) Date of Reissued Patent: Feb. 20, 2007

(54) RING BINDER INSERTION CARRIER

(75) Inventor: Danny Fonfeder, Quebec (CA)

(73) Assignee: Buffalo-Eastcantra, Inc., Quebec (CA)

(21) Appl. No.: 29/209,134

(22) Filed: Feb. 19, 2004

Related U.S. Patent Documents

Reissue of:
(64) Patent No.: Des. 451,134
Issued: Nov. 27, 2001
Appl. No.: 29/129,332
Filed: Sep. 13, 2000

(30) Foreign Application Priority Data

Mar. 20, 2000 (CA) ..... 2000-0839

(51) LOC (8) Cl. ..... 19-04
(52) U.S. Cl. ..... D19/27
(58) Field of Classification Search ..... D19/26, D19/27, 32, 3, 33; 402/1, 4, 70, 79; 281/3.1, 281/38, 51; 206/214, 305, 5
See application file for complete search history.

(56) References Cited

U.S. PATENT DOCUMENTS

| | | | | |
|---|---|---|---|---|
| 2,194,003 A | * | 3/1940 | Brooks | 402/4 |
| 5,409,319 A | * | 4/1995 | Bedol | 402/1 |
| 5,876,144 A | * | 3/1999 | Bedol et al. | 402/4 |
| 6,183,157 B1 | * | 2/2001 | Brown et al. | 402/79 |
| 6,200,056 B1 | * | 3/2001 | Jordin et al. | 402/4 |

* cited by examiner

*Primary Examiner*—Paula A. Greene

(74) *Attorney, Agent, or Firm*—Antonelli, Terry, Stout and Kraus, LLP

(57) CLAIM

I claim the ornamental design for a ring binder insertion carrier, as shown and described.

DESCRIPTION

Figure 1:
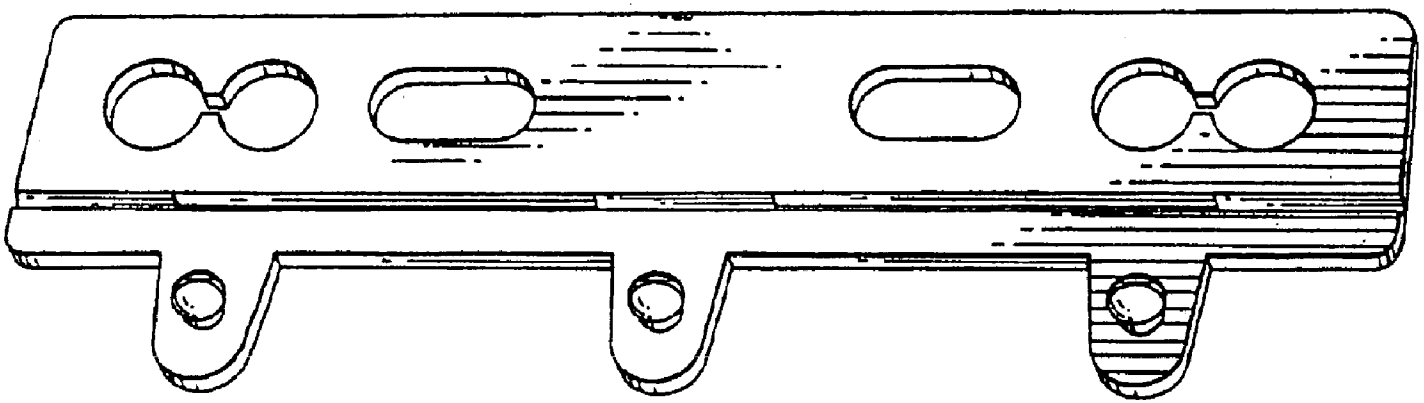
Figure 6:
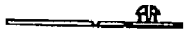
Figure 3:
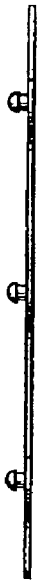
Figure 2:
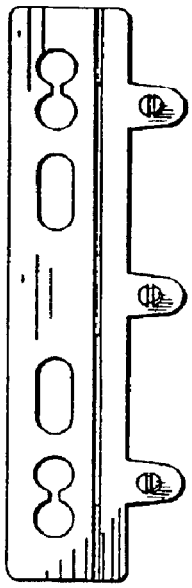
Figure 4:
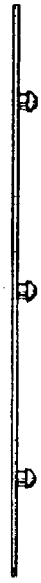
Figure 5:
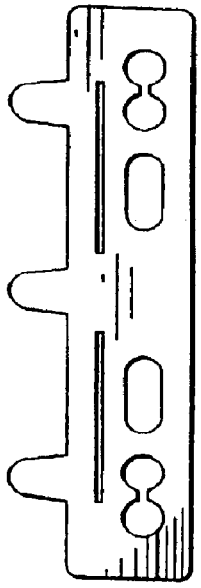
Figure 7:
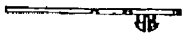
Figure 8:
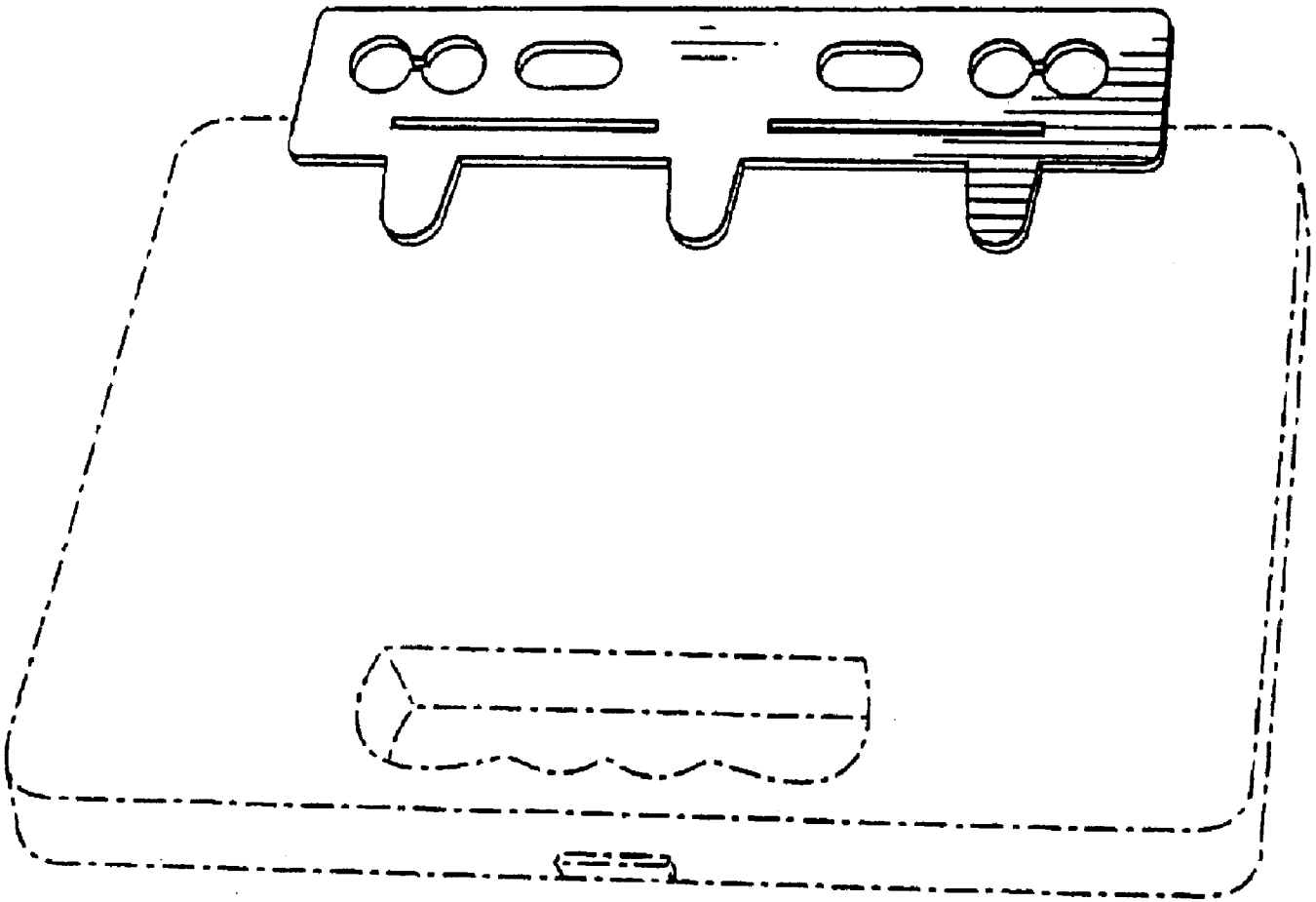

FIG. 1 is a perspective view of the ring binder insertion carrier embodying the design;
FIG. 2 is a top plan view of the ring binder insertion carrier of FIG. 1;
FIG. 3 is a right side elevational view of the ring binder insertion carrier of FIG. 1;
FIG. 4 is a left side elevational view of the ring binder insertion carrier of FIG. 1;
FIG. 5 is a bottom plan view of the ring binder insertion carrier of FIG. 1;
FIG. 6 is a front elevational view of the ring binder insertion carrier of FIG. 1;
FIG. 7 is a rear elevational view of the ring binder insertion carrier of FIG. 1; and,
FIG. 8 is a perspective view of the ring binder insertion carrier of FIG. 1 shown in its environment mounted to the back portion of a geometry kit case.
The broken lines in FIG. 8 are for illustrative purposes only and form no part of the claimed design.

1 Claim, 3 Drawing Sheets

Matter enclosed in heavy brackets [ ] appears in the original patent, but forms no part of this reissue; matter printed in italics indicates the additions made by reissue.